(12) United States Patent
Todd et al.

(10) Patent No.: US 6,786,445 B1
(45) Date of Patent: Sep. 7, 2004

(54) METHOD FOR PACKING TAPE ON A SPOOL WITHOUT TAPE EDGE WEAR

(75) Inventors: Christian Allen Todd, Thornton, CO (US); Donovan Milo Janssen, Boulder, CO (US); Phillip Monroe Morgan, Berthoud, CO (US); Daniel W. Underkofler, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 76 days.

(21) Appl. No.: 10/115,040

(22) Filed: Apr. 2, 2002

(51) Int. Cl.[7] ............................................. B65H 75/14
(52) U.S. Cl. ........................... 242/548.2; 242/548.4; 242/614
(58) Field of Search .................... 242/548.2, 548.4, 242/529, 578.3, 614, 345, 348, 348.3, 578

(56) References Cited

U.S. PATENT DOCUMENTS

| | | | |
|---|---|---|---|
| 2,971,721 A | * | 2/1961 | Jones ....................... 242/574.1 |
| 3,006,570 A | * | 10/1961 | Boser ......................... 242/578 |
| 3,309,037 A | | 3/1967 | Amos |
| 3,698,655 A | | 10/1972 | Chang ........................... 242/76 |
| 4,068,789 A | | 1/1978 | Young, Jr. et al. ............. 226/3 |
| 4,203,564 A | | 5/1980 | Nemoto ..................... 242/71.8 |
| 4,421,228 A | | 12/1983 | Marsiglio et al. .......... 198/814 |
| 4,572,417 A | | 2/1986 | Joseph et al. ................. 226/20 |
| 4,747,563 A | | 5/1988 | Sasaki et al. ................ 242/199 |
| 4,932,600 A | * | 6/1990 | Usui et al. ................ 242/548.4 |
| 4,990,215 A | | 2/1991 | Anderson ................... 156/540 |
| 5,028,012 A | * | 7/1991 | Kita ......................... 242/548.4 |
| 5,087,318 A | | 2/1992 | Anderson ................... 156/540 |
| 5,284,308 A | | 2/1994 | Comeaux et al. ........... 242/199 |
| 5,533,690 A | | 7/1996 | Kline et al. ................. 242/547 |
| 5,803,388 A | | 9/1998 | Saliba et al. ................ 242/348 |
| 5,865,389 A | | 2/1999 | Gonzales ..................... 242/358 |
| 6,040,966 A | | 3/2000 | Erickson ..................... 360/132 |
| 6,045,086 A | | 4/2000 | Jeans ....................... 242/548.3 |
| 6,062,500 A | * | 5/2000 | Coles ....................... 242/332.8 |
| 6,098,915 A | | 8/2000 | Nakae et al. ................ 242/527 |

* cited by examiner

*Primary Examiner*—Kathy Matecki
*Assistant Examiner*—Sang Kim
(74) *Attorney, Agent, or Firm*—Yee & Associates, P.C.

(57) ABSTRACT

A spool system for packing tape on a hub. The spool has upper and lower flanges on the hub, and a flexure positioned on the hub between the two flanges. The flexure is normally parallel to the flanges, but when a force is applied to the tape lead-in edge of the flexure, that edge of the flexure is pressed toward one of the flanges. This causes the tape lead-in side of the spool system to have a wider opening than the tape packing side of the spool system. The width of the space on the tape packing side is preferably equal to or narrower than the width of the tape to be packed, so that the flexure presses against the edge of tape as it loads, reducing stagger of the tape.

20 Claims, 7 Drawing Sheets

METHOD FOR PACKING TAPE ON A SPOOL WITHOUT TAPE EDGE WEAR

BACKGROUND OF THE INVENTION

1. Field of the Invention

The present invention relates generally to devices which handle machine readable tape wound on a spool or reel, and particularly to an apparatus that efficiently packs tape onto a spool.

2. Background of the Invention

Magnetic tapes, including reel and cassette-style cartridges and other devices that use magnetic media, are used in many industries to store data, programs, and other information. Magnetic tapes are typically stored on reels or spools, which are cylinders about which the tape is wound, typically having flanges to guide the tape onto the cylinder. Accessing information from a reel or spool of tape typically requires the spool be inserted into a reading machine, which unwinds the tape from the file spool and winds it onto a temporary storage spool (also referred to as a machine reel or machine spool) until the portion of the tape with the desired information is reached. A magnetic read element reads the information, and the tape is rewound back onto the original file spool and removed from the reader.

On a typical spool holding the magnetic tape, the spacing between the upper and lower flanges of the spools (both the file spool and the machine spool) is wider than the nominal width of the tape. As the tape is fed onto these spools, the tape tends to seek either the upper or lower flange as a hard stop or guide. Since the flange spacing is wider than the tape, the tape often switches which flange it is guiding against resulting in a staggered wrap. This stagger causes two problems. First, the tape can get folded over and be damaged during shipping if one of the flanges is forced against one of the staggered wraps (for example, if the spool is dropped).

The second problem occurs in the actual tape drive. As the tape is fed from the spool with the staggered wraps across the read/write head, higher tape edge loading is required to guide the tape into a functional position with respect to the read/write element. This stagger wrap condition is aggravated during high speed rewinding of the tape due to air entrainment. Unfortunately, the flange spacing and taper is required on spools in order to account for spool run out, flange run out, file and machine reel motor elevation differences as well as the tape width tolerance itself.

Additionally, technological advancement in tape industry practices have caused tapes to be made thinner, with increasing track densities. This requires better guiding of the tape, as well as lower edge guiding forces due to the decreased thickness of the tape.

Attempts to address these problems have included a radial tracking device which physically rubs the tape and guides it onto the spool so as to reduce stagger. Such devices are complex, and result in tape wear as well as debris being introduced into the tape pack. Such devices are often large and incapable of fitting into a tape cartridge. Examples of prior art spool systems include U.S. Pat. Nos. 6,045,086 and 5,803,388.

In some prior art systems, the tape packing mechanism is direction dependent, meaning that the device works when oriented a certain way, but not in other ways. This can be a disadvantage when the same spool can be used to unload tape, but is later used to reload the tape. If the packing mechanism is direction dependent, then some re-orientation of the spool or the packing device may be required.

Therefore, the current technology would be improved by a device which guides tape onto a spool which does not wear the tape nor introduce debris, and which will fit on both the file (cartridge side) and machine reel (drive side) in a tape drive.

SUMMARY OF THE INVENTION

A tape packing mechanism is herein disclosed. In a preferred embodiment, the packing mechanism comprises a flexure (also referred to herein as a packing device) which rotates with a spool as tape is added. The flexure is pressed close to the nearest flange on the tape lead-in side by a magnet or roller or other device. The magnet or roller preferably does not rotate with the spool or reel system, therefore constantly holding the flexure nearer to the flange on the tape lead-in side as the reel rotates. Thus, the flexure has a constantly wider spacing on the lead-in side, and a narrower spacing on the tape packing side. The spacing on the packing side is preferably equal to or less than the tape width.

Since the flexure rotates with the spool there is no relative motion between the tape and the packing device. Relative motion between the packing device and the tape has a tendency to generate debris, which can cause problems in a tape packing system. A preferred embodiment of the present innovations has no relative motion between the tape and the packing device. The packing device preferably spans the entire tape pack from the hub to the outer diameter, therefore no tracking mechanism is required. Additionally the packing device provides a gentle lead-in for the tape as it is fed onto the spool. Finally and foremost, the packing device provides a zero clearance fit for the tape which results in a smooth tape pack with no stagger wraps.

This new tape packing device minimizes the tape excursions that are currently seen in a tape drive. The reduced tape movement will result in lower tape guiding forces, less wear and easier track following. The innovative device is also direction independent, meaning the device will work in a variety of orientations, both loading and unloading tape, for example. All of the traits are required as we move forward with thinner tape and higher track densities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The following section describes the present innovations with reference to the drawings. Though specific dimensions are given in these example embodiments, they should not be read to limit the structures to only those sizes listed. They are for example purposes only.

Figure 1:
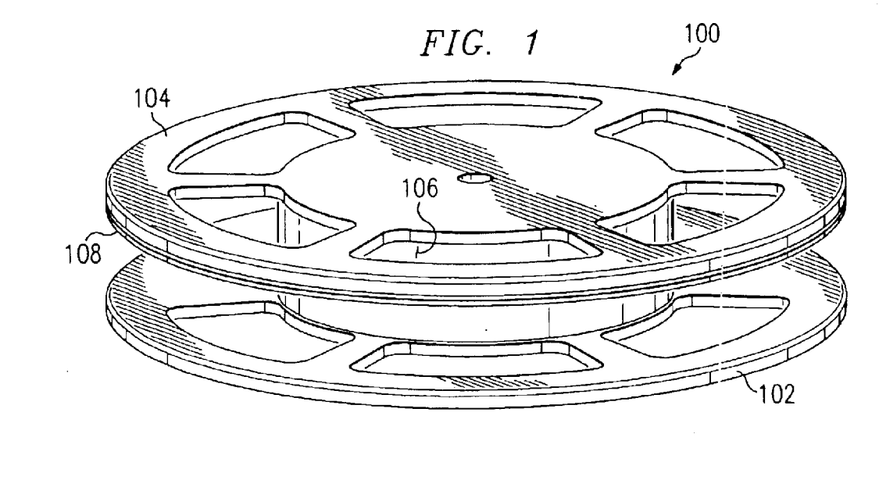
FIG. 1 shows a spool according to a preferred embodiment.

FIG. 1 shows the packing mechanism and tape reel 100 as assembled according to a preferred embodiment. This embodiment of the innovative device comprises lower flange 102 and upper flange 104. These are connected to a cylindrical drive hub 106 around which tape is wound. Packing flexure 108 is shown beneath upper flange 104. In preferred embodiments, packing flexure 108 is a thin flexible plate that sits parallel to upper flange 104 and rotates with the flanges and reel itself. Note that the lower flange, also called the packing flange since it provides one surface against which tape is packed, need not be a continuous surface. For example, it can have a radial gap or slot for the insertion of tape threaders, etc. The packing device or flexure is preferably a continuous surface.

The innovative device of FIG. 1 is assembled by mounting lower flange 102 onto drive hub 106. Packing flexure 108 is then mounted onto hub 106 and finally upper flange 104 is mounted so as to capture packing flexure 108.

Figure 2A:
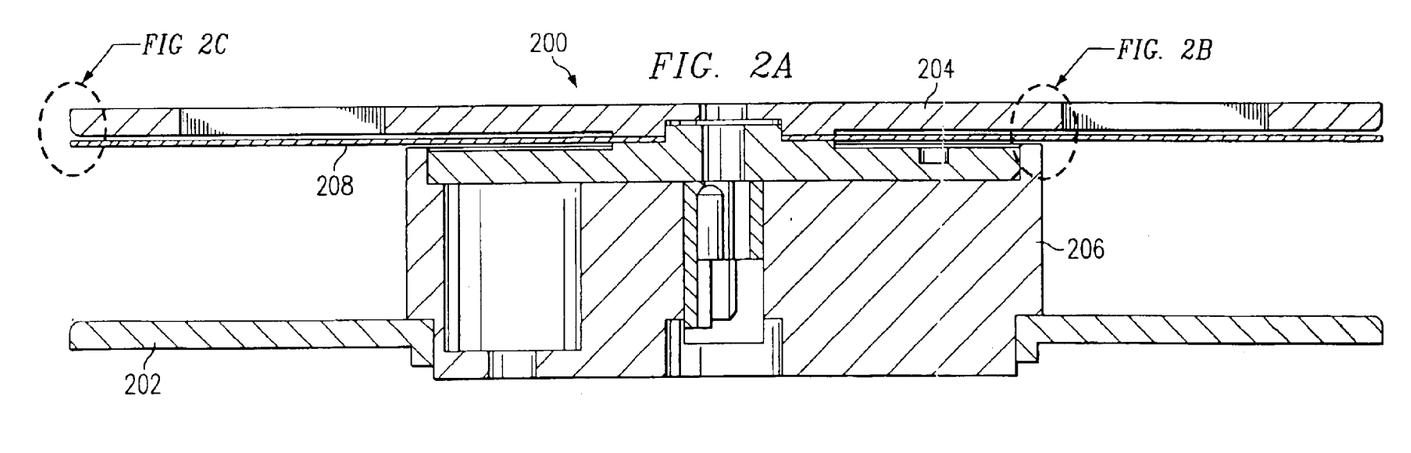
FIGS. 2A–2C show a sectional view of the innovative system where the flexure is not deflected.

FIG. 2A shows a cross-section of the assembled reel device 200 in its normal, un-deformed state. Lower flange 202 is connected to drive hub 206. Upper flange 204 and packing flexure 208 attach to the opposite end of drive hub 206, with upper flange 204 outside packing flexure 208 and holding packing flexure 208 in position. When employed for its intended use, tape or some type of webbing is wrapped around drive hub 206 between lower flange 202 and packing flexure 208.

Packing flexure 208 and upper flange 204 are preferably parallel and have a small gap between them, allowing some flexing movement of packing flexure 208. In preferred embodiments, packing flexure 208 and the rest of the reel device rotate together.

Figure 2B:
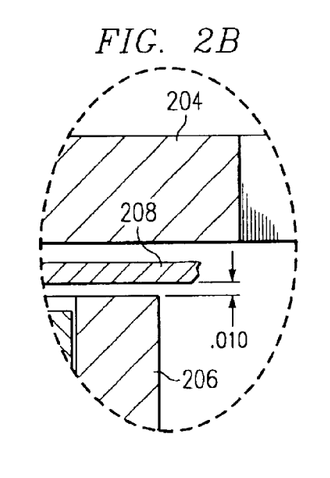

FIG. 2B shows a detail of the area labeled "Detail B" from FIG. 2A. Note that there is a nominal clearance between the hub 206 and the packing flexure 208 as well as between the packing flexure 208 and the upper flange 204. This lower clearance is preferred, though not necessary, in the operation of the innovative device, as described more fully below. Note that the distances given in these figures are sample dimensions only, and do not restrict the innovations. Other dimensions and sizes will work with the present innovations.

Figure 2C:
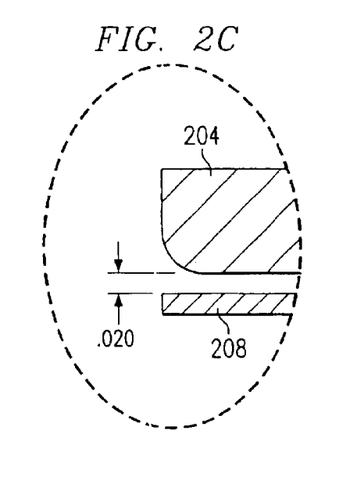

FIG. 2C shows a detail of the area labeled "Detail C" from FIG. 2A. Note again the nominal clearance between upper flange 204 and the packing flexure 208. In a preferred embodiment, this spacing is 0.020 in, as shown.

Note that the size of the gaps shown in FIGS. 2B and 2C help determine the size of the load applied to the tape edge when the flexure is deflected. For example, if the gap shown in FIG. 2B were increased from 0.010 inches to a larger amount, the flexure would have greater room to impinge on the tape packing side, leaving a narrower space in which the tape would be packed and causing a larger force to be applied to the tape edge. Of course, this force must not be too great in order to avoid buckling the tape or damaging the tape edge. Likewise, altering the gap shown in FIG. 2C would also affect the force applied to the tape edge, in a similar way, though with less effect. The material of the flexure also affects the load applied to the tape edge, as mentioned below.

Figure 3A:
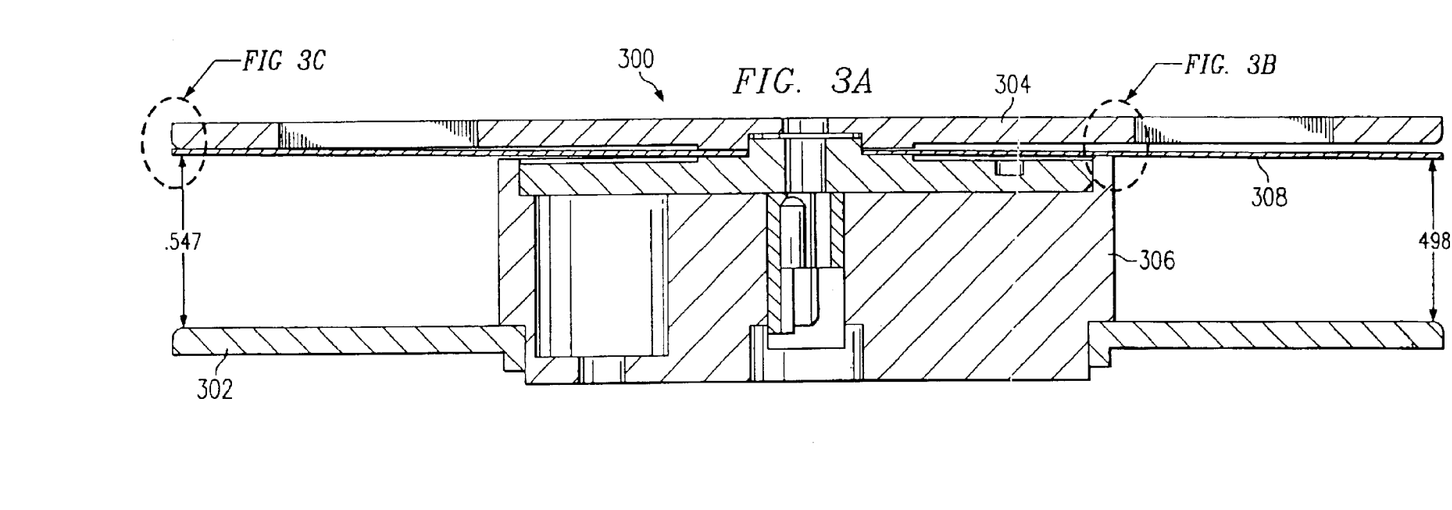
FIGS. 3A–3C show a sectional view of the innovative system where the flexure is deflected.
Figure 3B:
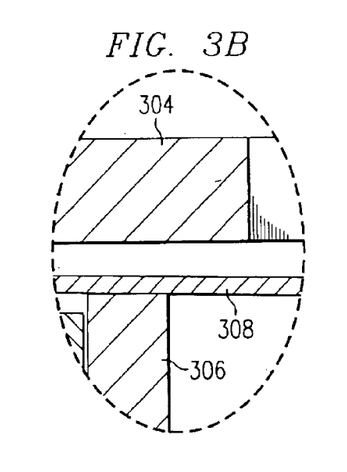
Figure 3C:
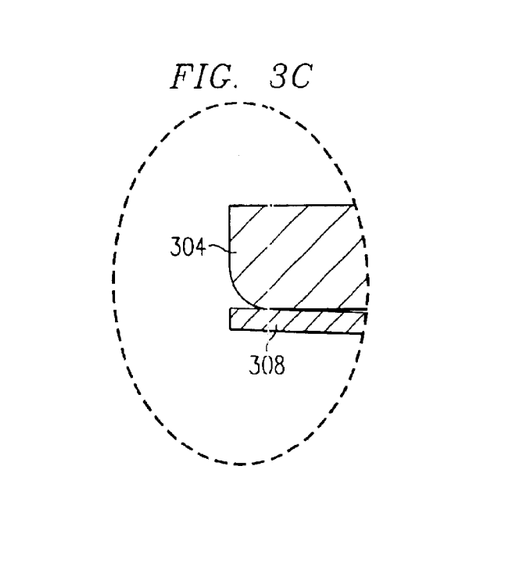

In order for this device to function, packing flexure 208 is raised on one side of the device and results in the geometry shown in FIGS. 3A–3C.

FIG. 3A shows a cross section of the innovative reel 300 with the flexure deformed, according to a preferred embodiment. Lower flange 302, hub 306, and upper flange 304 are generally the same as in FIG. 2A. Flexure 308 is shown in this figure as having been deformed by a force so that part of the flexure (on the left end of FIG. 3A at Detail C) is pressed against upper flange 304, while another part of the flexure (on the right side at Detail B) is pressed against the hub 306. This results in a gap on the right side of the device which is less than the nominal width of the tape. The right side of the figure, where the opening width is less than the tape width, is where packing occurs. The flexure presses against the near edge of the tape as the tape is wound, keeping the tape consistently wrapped and preventing stagger of the tape. Since the flexure rotates with the flange and the hub itself, there is no relative motion between the flexure and the tape. This reduces the generation of particles and debris due to relative motion between the packing device and the tape, and also helps to pack the tape.

It should be noted that the flexure is preferably deflected by a force applied to its tape lead-in edge, or (less preferably) to its tape packing edge, or both.

FIG. 3B shows a detail of the area labeled "Detail B" in FIG. 3A. In this detail, flexure 308 is shown pressed flush against the hub 306. This decreases the width of the space between flexure 308 and lower flange 302.

FIG. 3C shows a detail of the area labeled "Detail C" in FIG. 3A. Flexure 308 is shown pressed into contact with upper flange 304. The gap created by this is wider than the tape which is to be loaded onto the reel. Thus, the left hand side is the tape lead-in side, and the right hand side is the tape packing side.

Figure 4:
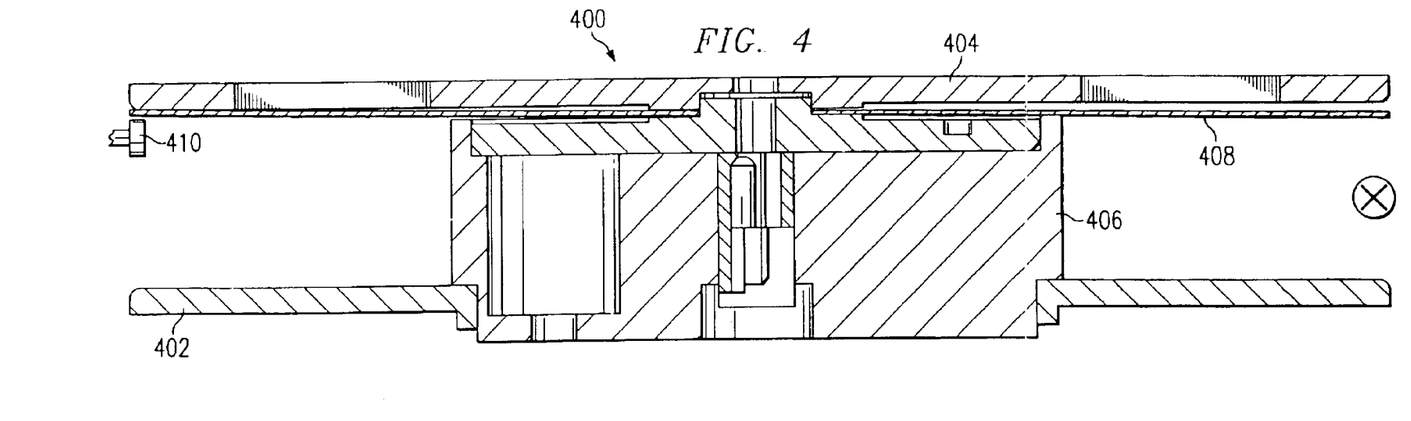
FIG. 4 shows a sectional view of the innovative system where a roller deflects the flexure.

FIG. 4 shows the reel 400 with one mechanism for deforming the packing flexure 408 in accordance with a preferred embodiment. As shown previously, lower flange 402 attaches to reel 406, and packing flexure 408 fits on next followed by upper flange 404.

Roller 410 is shown in this example. Roller 410 is located at the lead-in side of the reel, where tape is accepted to be wound on the hub 406. Roller 410 is positioned so that the tape lead-in edge of flexure 408 is pressed against upper flange 404. Roller 410 comprises, in a preferred embodiment, an axle and a wheel positioned to press an edge of flexure 408 against top flange 404. As the reel turns and tape is wound, roller 410 maintains its original position relative to the tape lead-in side. In other words, roller 410 stays in place so that the flexure 408 is constantly pressed against upper flange 404 on the same left-hand side of the reel (as shown in this figure). There is preferably no slippage between the wheel of roller 410 and flexure 408. By constantly pressing the flexure against the upper flange on the lead-in side of the reel, the flexure is necessarily pressed downward against the packed tape on the tape packing side of the reel. Also, since the flexure rotates with the reel and the tape, there is no friction produced between the flexure and the tape being wound. This reduces the generation of debris due to relative movement between the packing device and the tape.

Figure 5:
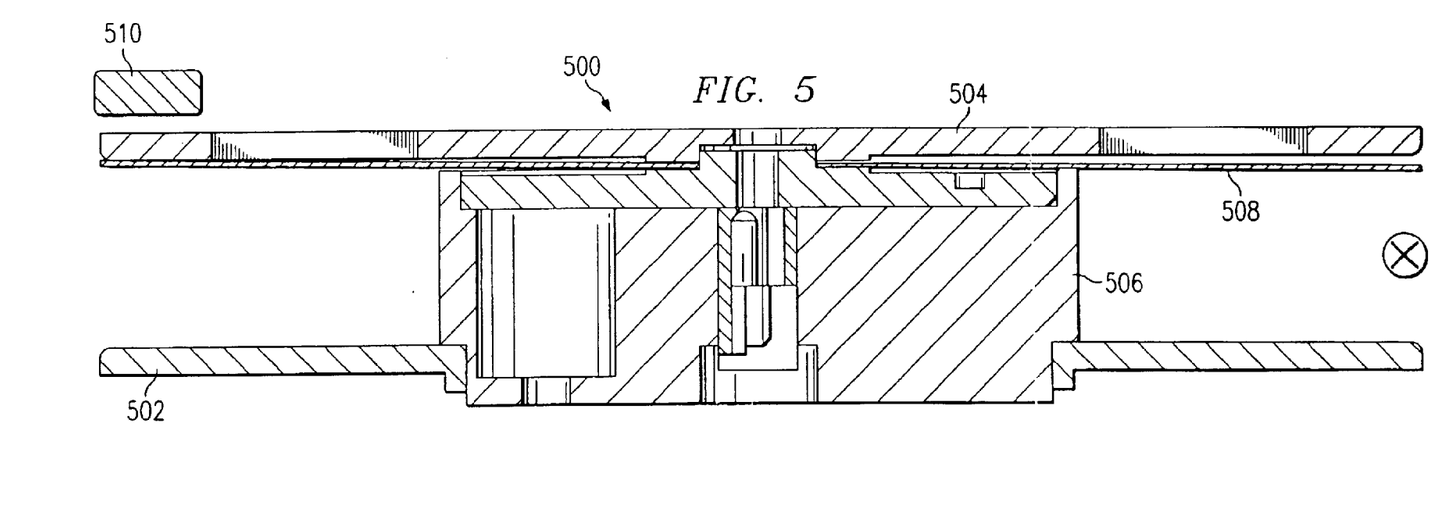
FIG. 5 shows a sectional view of the innovative system where a magnet deflects the flexure.

FIG. 5 shows a preferred embodiment of the innovative reel 500 in which a magnet 510 is used to deflect the packing flexure 508. In a preferred embodiment, the packing flexure is made of steel, though of course other magnetically deformable materials can be used. The tape enters on the left side of the spool 500, is guided by the deformed (curved) flexure 508 until the tape is captured between the lower flange 502 and the flexure 508. The deformed flexure remains in contact with the top of the tape which is radially the farthest from the hub until the reel is full if necessary. In a preferred embodiment, the force is applied to the edge of the flexure at the lead-in edge of the flexure and spool system.

It should be noted that magnet 510 preferably remains in a fixed location with respect to the drive and does not spin with the spool 500. This creates a fixed packing location on the spool 500. Packing flexure 508 is held up (wider than the tape) by magnet 510 on one side of reel 500 and deforms down to a low point (narrower than the tape) on the far side of reel 500. The packing flexure 508 stays shaped like this even though the spool is turning since magnet 510 is not moving. This creates the condition in which there is no relative motion between the tape and the packing device while spinning.

It should be noted that the magnet in this example embodiment, the deflection device (a magnet in this case) is positioned above, but not touching, the spool flanges or the packing device. This is particularly important in embodiments which use a cartridge system, where the spools holding tape are housed at least partially by a cartridge shell of some material. In such a case, the cartridge shell may be between the packing device and the deflection device (i.e., between the upper flange and the magnet which attracts the flexure). Thus the present invention allows the deflection device to work with cartridge systems while not requiring a refitting of cartridge shells. This makes implementing the innovative system into existing apparatus less costly.

Figure 6A:
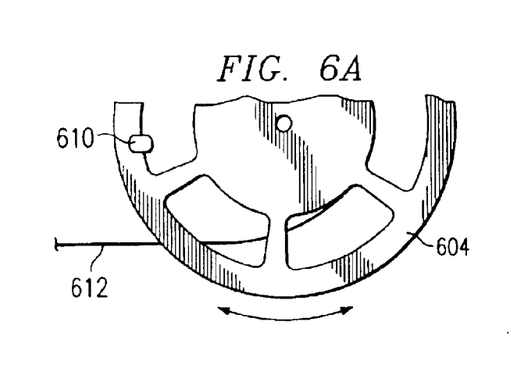
FIGS. 6A–6B show the innovative system with a magnet deflecting the flexure and the position of tape.
Figure 6B:
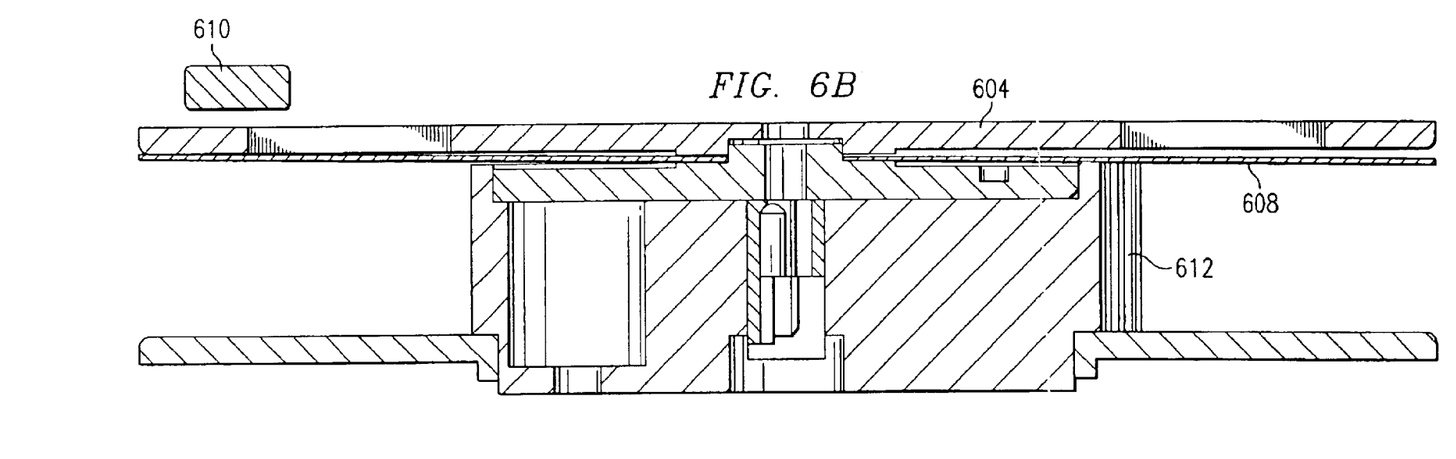

FIG. 6A shows a top view of a section of an innovative reel system, and FIG. 6B shows a sectional view of the innovative reel with tape thereon.

FIG. 6A shows the upper flange 604 with magnet 610 positioned on the lead-in side of the reel. Tape 612 is shown on the lead-in side. Magnet 610 deforms the flexure (not shown) so that it is pressed against upper flange 604 on the lead-in side (left side in this figure) and angled down on the tape packing side (right side in this figure).

FIG. 6B shows a sectional view of the innovative reel system. Magnet 610 attracts (preferably metal) flexure 608 to upper flange 604 on the lead-in side, which forces flexure 608 toward tape 612 on the tape packing side of the reel. Since the magnet does not rotate with the reel, the flexure is attracted to the upper flange on only the lead-in side, where the magnet is located.

Alternative embodiments of the flexure structure include using a plastic flexure with a metal band or coating, for example. Or an entirely plastic flexure can be used, though obviously a magnetic deflecting mechanism would have to be replaced by, for example, a roller deflection mechanism that deflects the packing flexure with pressure rather than magnetic force.

Alternatively, the packing device can be a rigid body with a flexing section in the center, for example. Thus, when force is applied to an edge of the packing device, the entire packing device itself does not bend, but a flexible ring of the device bends. Note that the material of the packing device will affect the transfer of the load from the packing device to the tape edge. In other words, a rigid or non-flexible packing device will apply a greater percent of the load upon the tape edge, while a more flexible material will impart less load to the tape edge due to its flexibility. It should be noted that the term "flexure" as used herein includes both rigid packing devices, and the above-described flexible packing devices, whether made entirely from a flexible material or made partly with a rigid material with a section of flexible material.

Figure 7:
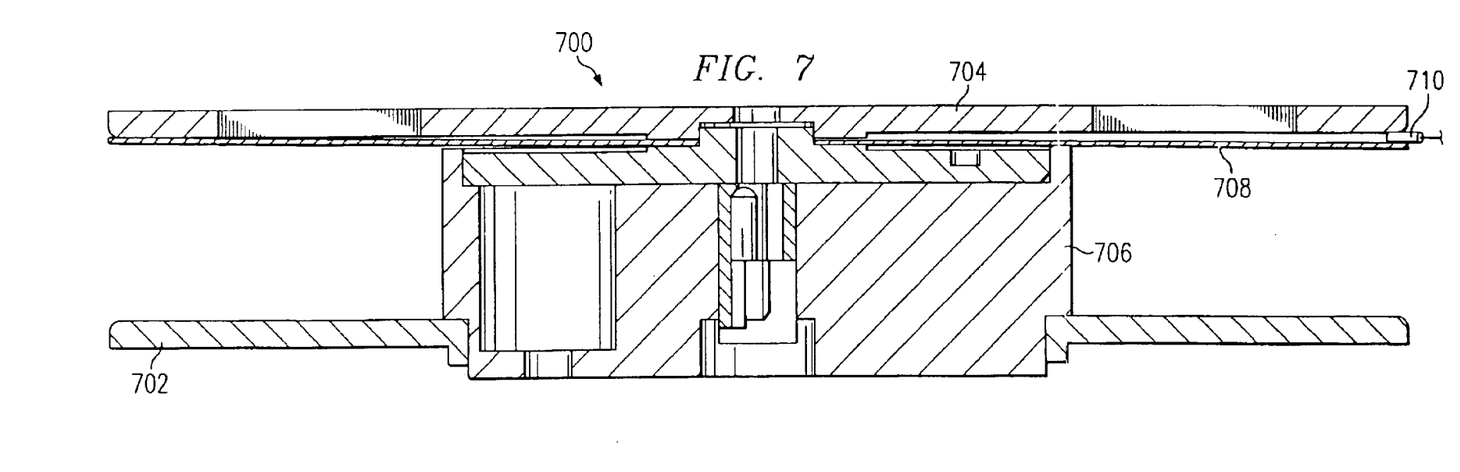
FIG. 7 shows an alternative embodiment to the present innovations.

In the previously discussed examples, the flexure is shown being depressed toward the upper flange on the tape lead-in side, thereby causing the opposite (tape packing) side of the flexure to be moved away from the upper flange. However, The flexure can also be moved away from the upper flange by a device positioned on the tape packing side, such as a non-rotating spacer or a roller that provides a minimum separation between the flexure and the upper flange. FIG. 7 shows such a configuration. Note that as tape is loaded onto the spool, the rolling device (or other flexure deflection device) preferably moves to accommodate different amounts of tape on the hub. This embodiment would require a moving or variable deflection device, which is less preferred but still within the contemplation of the present innovations.

FIG. 7 shows first and second flanges 702, 704, connected to hub 706. On the right side of this figure, on the tape packing side of the spool system, flexure 708 is separated from upper flange 704 by spacer or roller 710. Spacer or roller 710 separates upper flange from flexure 708 so that the distance between flexure 708 and lower flange 702 is equal to or less than the width of the tape to be wound on the spool system. Of course, spacer or roller 710 does not rotate with the spool system, so that it is constantly the tape packing side of the spool system that has compressed tape packing space. The spacer or roller can also comprise multiple rollers, as necessary to provide smooth rotation of the system and constant spacing of the flexure and flanges.

Figure 8A:
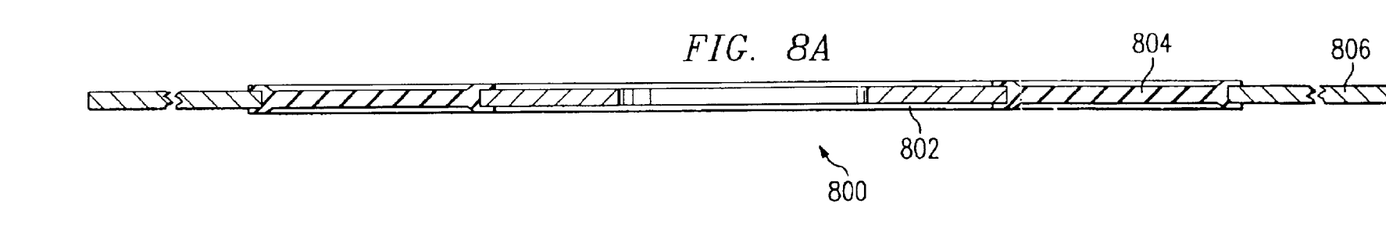
FIGS. 8A–8C show views of an innovative flexure structure according to a preferred embodiment.
Figure 8B:
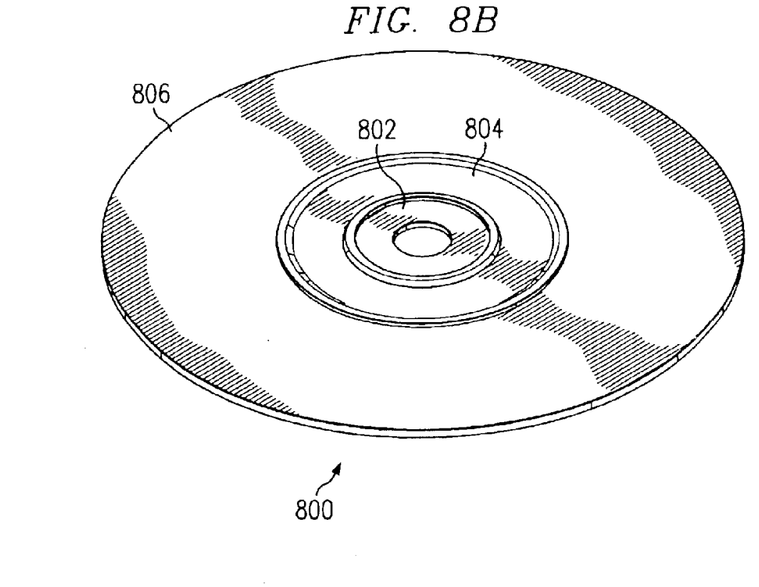
Figure 8C:
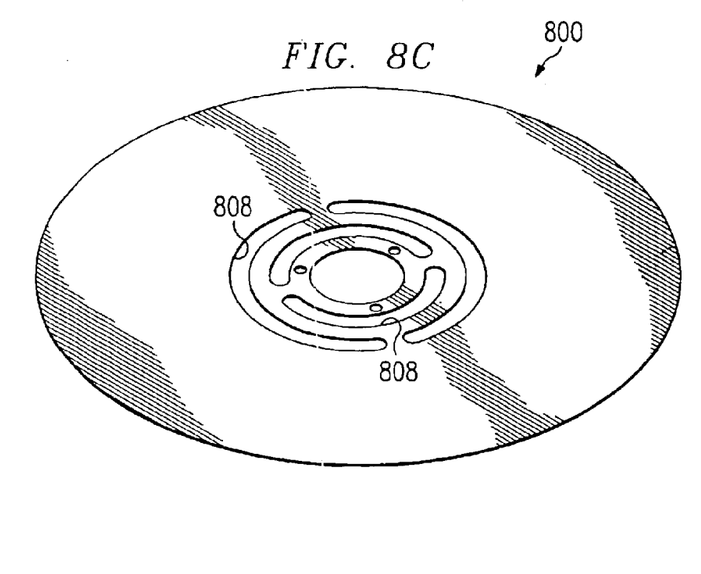

FIGS. 8A, 8B and 8C show an alternative embodiment for the flexure structure. In FIG. 8A, a side view of the packing device or flexure 800 shows both rigid and flexing sections. The interior of the packing device 800 has a rigid section 802 which is connected to a flexible section 804. Outside the flexible section 804 is another rigid section 806.

This embodiment of the packing device 800 allows for the device to be attached to the hub or center of the reel or spool in a rigid way, while still allowing the packing device to perform its duty of tape packing. By exerting a force by any of the disclosed means on an edge of the packing device, the flexible portion of the packing device allows the device to shift position, achieving the deflection desired to narrow the tape packing clearance between the packing device and the bottom flange.

FIG. 8B shows a perspective view of the innovative packing device 800. The flexible section 804 is surrounded on both sides by rigid sections 802, 806 so that the center 802 of the packing device 860 may remain rigidly fixed (for example, parallel to the top and bottom flanges or rigidly affixed to the hub) while allowing the outer section 806 to be deflected and therefore aid in packing the tape without stagger.

FIG. 8C shows another alternative embodiment for the innovative packing device 800. In this example, the added cutouts 808 from the packing device 800 allow the packing device 800 to bend when force is applied at an edge. Hence, the packing device can be made from an otherwise rigid material such as steel, while maintaining enough flexibility to perform as necessary in a preferred embodiment of the herein described invention.

Alternative embodiments can of course be employed in that capture the current innovations but which do not use the exact example implementations discussed here. For example, various kinds of deflection devices could be used to deflect the flange. For example, a Teflon impregnated plastic deflection mechanism could be used to slide along the flexure instead of a roller or magnet. Likewise, the deflection mechanism could comprise an air bearing to pneumatically support or deflect one side of the flexure.

Figure 9:
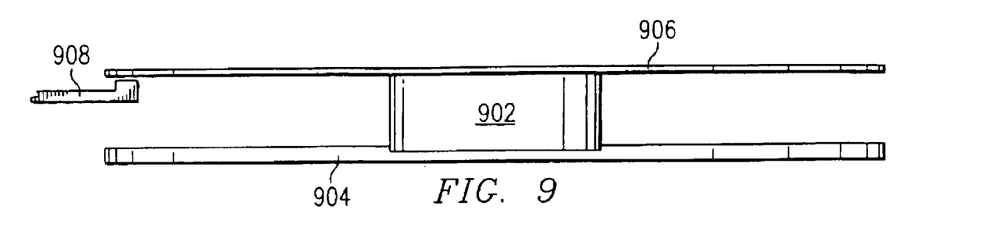
FIG. 9 shows a side view of an innovative spool according to a preferred embodiment.

The upper flange can be eliminated from the embodiment entirely, relying on the flexure to provide the guidance that keeps the tape on the reel. In such a case, a magnetic deflection device or a roller deflection device, for example, could deflect the packing device toward where the upper flange would normally be. In other words, the upper flange need not be present to serve as a stop for the deflection of the packing device. FIG. 9 shows such an embodiment where the upper flange is absent. The hub 902 has a bottom flange 904 but the top flange role is served by the packing device 906. A deflection device 908 of some make is shown below the flexure, though less preferred embodiments could have the device above the flexure, for example.

Figure 10:
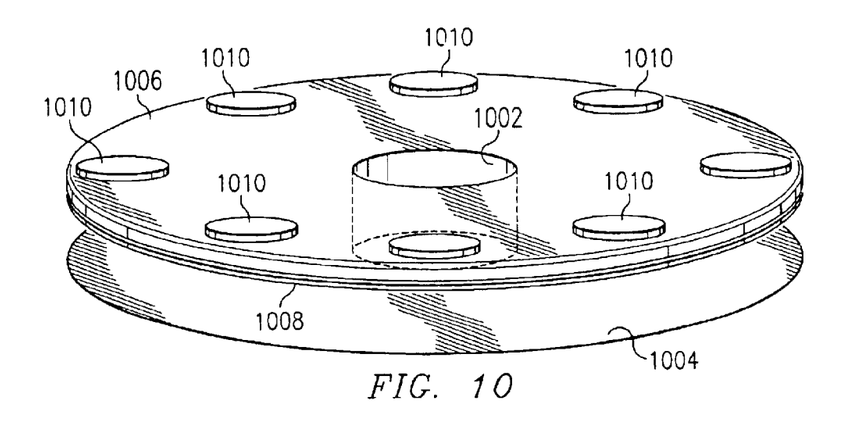
FIG. 10 shows a perspective of an innovative spool structure according to a preferred embodiment.

FIG. 10 shows yet another embodiment of the current innovations. This embodiment has more than one deflection device. This example figure shows the hub 1002 with bottom flange 1004 attached. Top flange 1006 has flexure 1008 nearby, as previously described in detail. Positioned above top flange 1006 are deflection devices, in this case magnets 1010 (preferably electro-magnets). The deflection devices are spaced at intervals in this example, though they could asymmetrically disposed in other embodiments. The deflection devices are preferably positioned in fixed locations relative to the spool, though they can be fixed on the spool itself so as to rotate with the spool, though this is less preferred, as discussed further below.

This innovative embodiment has at least three uses. First, in an embodiment where there are multiple deflection devices, the packing device or flexure can be raised at all points simultaneously, thereby providing clearance between the tape and all edges of the packing flexure for when tape must be run off quickly.

Second, in a preferred embodiment, the flexure can be deflected at a plurality of points near the lead in edge, providing a more stable "three-point stance" to the deflection of the flexure. Instead of deflecting the flexure at a single point, it is deflected at two or three nearby points. This is particularly useful when, for example, the flexure is made from a thin material and deflection has a tendency to warp the material, causing the flexure to lose its planar attributes.

Another use for the innovative embodiment of FIG. 10 is to use only those deflection mechanisms needed, at times when they are needed. For example, the deflection mechanisms 1010 could be electromagnets. The strength of each of the given magnets could be varied so as to provide optimal performance, turning some magnets off as they are not needed, while turning others on when they are needed. For example, five electromagnets could be placed around the device, mounted firmly onto the top flange, and as they each rotate to the "front" edge or tape lead in edge, that particular electromagnet could be energized to provide deflection of the packing device. When that magnet is no longer at the tape lead in edge, that magnet would be powered down to let the flexure go back down or to its resting position. As each magnet passes the tape lead in edge, they can be energized to provide a "moving" deflection device that only deflects one edge of the flexure as the flexure itself rotates. This same innovation can also be implemented using permanent magnets which are displaced relative to the spool system (i.e., moved closer to or farther from). When the permanent magnets are close to the flexure, they attract it, when they are far away, the flexure assumes its natural position.

Such a system can be particularly useful, for example, because when tape is added to a reel, the radius at which the tape winds changes. Thus, as tape is added and the radius changes, the lead in edge of the flexure can be deflected less and less and still impinge on the edge of the tape to be packed. Variable use of the deflection devices allows for dynamic changing of the flexure at different angles. More deflection can be used to pack relatively empty spools, with less deflection needed as more tape is added. It should be noted that such an embodiment is less preferred, because of the necessity of controlling the strength of the magnets during possible changes in, for example, the rate of rotation of the spool or the necessary deflection angle of the packing device.

Also note that as tape winds off one reel onto another, the radius at which the tape leads in changes (i.e., it comes in at a different angle from a full reel than it does from an empty reel). This provides another benefit to having the deflection devices able to deflect the lead-in edge at different locations. As the unwinding tape empties, the position at which the flexure is deflected on the winding tape can change so as to provide maximum clearance for the tape.

It should be noted that the flange against which the tape packs (i.e., the bottom flange in the examples given) typically has a taper, rather than being at right angles to the axis of the hub. Such a design is shown (in an exaggerated fashion) in FIG. 11. This taper to the packing surface means that a slight taper exists in the tape as it is being packed. When two spools are used to run tape off one onto another, for example as in a machine reel and a file spool, as tape exits the first full spool, it is packed onto an empty spool. This means that the tape leaves a reel at a first taper point, but packs at a different taper point (since it is leaving from a reel's outer radius, and packing onto another reel's inner radius-which are differentiated by the slight taper of the packing surface mentioned above). This difference causes skew at the head as the tape rocks across the read head while moving. As the tape unwinds from one reel and winds onto the other reel, the taper changes, causing a dynamic skew, which slowly changes as the tape is read.

Figure 11:
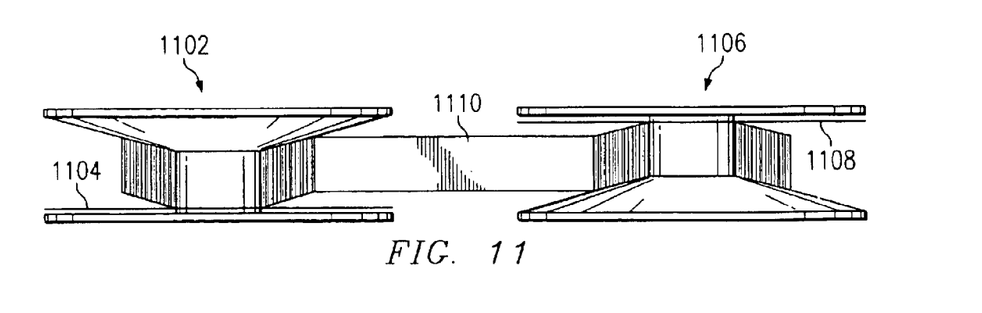
FIG. 11 shows an innovative system implementing the preferred embodiments.

This skew is increasingly important as data density increases. This problem can be alleviated by equipping the two involved reels with the innovative flexures. FIG. 11 shows another innovative embodiment which alleviates this problem. A first reel 1102 has the flexure 1104 on one side, the second reel 1106 has a flexure 1108 on a different side relative to the first reel 1102. For example, if the unloading reel 1106 had the packing flexure 1108 on its top, the loading reel 1102 would have the flexure 1104 on its bottom. The system also shows a tape 1110 wrapped around each hub and stretching between the two reels. The tape is also shown packed on the tapered packing flange of each spool.

Alternating the flexures 1104, 1108 in this way allows the packing flexures to hold the tape 1110 in a steady location as it unwinds from one reel and winds onto the other, alleviating the skew that results from non-symmetric unwinding and packing surfaces. The flexures, being on opposite sides of the tape on different reels, press on both sides of the tape 1110 in its circuit.

As storage technology improves and the industry produces thinner tape with increasing track densities, better tape guiding techniques are needed. The innovative designs herein disclosed offer many advantages. For example, less initial tape movement will result as the tape exits the spool. Lower tape guiding forces will be required due to less tape movement, which is essential for thinner tape systems. Lateral tape accelerations are reduced. The innovative system also requires fewer components, and has lower cost and greater reliability than known systems, and offers the possibility of a tape drive design with no external tape edge guiding members. The lack of relative motion between the packing device and the tape results in no edge wear of the tape, and generates significantly less debris as tape is wound and unwound. The design is easy to implement, is low cost, and simple in design, and can also be implemented inside of a cartridge. If tape pack slips due to handling or thermal variations, one pass in the drive will reposition the tape pack edge. Also, multiple packing points are possible with more than one magnet.

What is claimed is:

1. A spool system, comprising:
   a first flange attached to a hub;
   a flexure attached to the hub;
   a second flange attached to the hub, the second flange being substantially parallel to the first flange;
   means for moving an edge of the flexure toward the second flange, wherein the means for moving do not rotate with respect to the center of the spool system.

2. The spool system of claim 1, wherein on a side of the spool system substantially opposite from said means for moving, the spacing between the flexure and the first flange is equal to or less than a width of a tape to be wound on said spool system.

3. The spool system of claim 1, wherein the means for moving an edge of the flexure comprise a plurality of deflection devices positioned such that the entire flexure may be moved toward the second flange.

4. A spool system, comprising:
   a first flange attached to a hub;
   a flexure attached to the hub substantially parallel to the first flange;
   a flexure displacement device for moving an edge of the flexure such that the flexure is not parallel to the first flange;
   wherein the flexure displacement device does not rotate with the flexure.

5. A spool system, comprising:
   a first flange attached to a hub;
   a flexure attached to the hub substantially parallel to the first flange;
   a flexure displacement device for moving an edge of the flexure such that the flexure is not parallel to the first flange;
   wherein the flexure is made at least partly from a metal, and wherein the flexure displacement device comprises a magnet positioned to attract an edge of the flexure toward a second flange, wherein the second flange is attached to the hub and is substantially parallel to the first flange.

6. A spool system, comprising:
   a first flange attached to a hub;
   a flexure attached to the hub substantially parallel to the first flange;
   a flexure displacement device for moving an edge of the flexure such that the flexure is not parallel to the first flange;
   wherein the flexure displacement device comprises a plurality of deflection nodes which only deflect the flexure at a tape lead in edge of the spool.

7. A spool system, comprising:
   a first flange attached to a hub;
   a flexure attached to the hub substantially parallel to the first flange;
   a flexure displacement device for moving an edge of the flexure such that the flexure is not parallel to the first flange;
   wherein the flexure displacement device comprises a plurality of deflection nodes which only deflect the flexure at a tape lead in edge of the spool; and
   wherein the plurality of deflection nodes comprise a plurality of electromagnets which rotate with the spool, wherein the power supplied to each of the plurality of electromagnets varies with angular position of a given electromagnet of the plurality.

8. A spool system, comprising:
   a rotatable hub having a first flange and a second flange affixed thereon;
   a flexure positioned on the hub between the first flange and the second flange;
   wherein the flexure is parallel to the first flange and the second flange when no force is applied to an edge of the flexure; and
   wherein the flexure is not parallel to the first flange and the second flange when a force is applied to the edge of the flange.

9. The spool system of claim 8, wherein the force is applied to a plurality of points on the flexure in order to deflect the edge of the flexure.

10. A spool system, comprising:
    a rotatable hub having a first flange and a second flange affixed thereon;
    a flexure positioned on the hub between the first flange and the second flange;
    wherein the flexure is parallel to the first flange and the second flange when no force is applied to an edge of the flange; and
    wherein the flexure is not parallel to the first flange and the second flange when a force is applied to the edge of the flange; and
    wherein the force is applied by a magnet which remains in a fixed position and does not rotate with the flexure.

11. A spool system, comprising:
    a rotatable hub having a first flange and a second flange affixed thereon;
    a flexure positioned on the hub between the first flange and the second flange;
    wherein the flexure is parallel to the first flange and the second flange when no force is applied to an edge of the flange; and
    wherein the flexure is not parallel to the first flange and the second flange when a force is applied to the edge of the flange; and wherein the force is applied only to a tape lead-in edge of the spool system, wherein the tape lead-in edge is fixed relative to an axis of rotation of the spool system.

12. A spool system, comprising:

a hub connected to a bottom flange;

a flexure structure connected to the hub, the flexure structure being substantially parallel to the bottom flange;

wherein when a force is applied to a first edge of the flexure structure, the flexure structure is deflected; and wherein a second force is applied to another edge of the flexure structure such that the entire flexure is moved away from the bottom flange.

13. The spool system of claim 12, wherein the amount of force is applied at a position on the first edge that varies depending on the angle at which tape is loaded onto the hub.

14. The spool system of claim 12, wherein the amount of force applied to the first edge of the flexure structure varies depending on an amount of tape that is present on the spool system.

15. The spool system of claim 12, further comprising a cartridge shell which houses at least part of the spool system.

16. A spool system, comprising:

a hub connected to a bottom flange;

a flexture structure connected to the hub, the flexture structure being substantially parallel to the bottom flange;

wherein when a force is applied to a first edge of the flexure structure, the flexure structure is deflected; and wherein the force is applied by a magnet that attracts the first edge of the flexure away from the bottom flange.

17. A spool system, comprising:

a hub connected to a bottom flange;

a flexture structure connected to the hub, the flexture structure being substantially parallel to the bottom flange;

wherein when a force is applied to a first edge of the flexure structure, the flexure structure is deflected; and wherein the force is applied to the first edge by a plurality of magnets positioned to deflect the first edge away from the bottom flange.

18. A spool system, comprising:

a hub connected to a bottom flange;

a flexure structure connected to the hub, the flexure structure being substantially parallel to the bottom flange when no external force is applied to the flexure structure;

wherein the flexure structure has a first section rigidly attached to the hub, a second section comprising a flexible material, and a third section; such that when a force is applied to an edge of the flexure structure, the second section deforms to allow the first section to remain rigidly attached to the hub while allowing the third section to be deflected such that it is no longer parallel to the bottom flange.

19. The spool system of claim 18, wherein the first section comprises steel, the second section comprises rubber, and the third reaction comprises steel.

20. A reel system, comprising:

a first spool and a second spool, wherein a tape is unwound from the first spool and wound onto the second spool, the first spool having a first flange and a first packing flexure, the second spool having a second flange and a second packing flexure;

wherein the first packing flexure is substantially parallel to the first flange, but is capable of being deflected by a first deflection mechanism;

wherein the second packing flexure is substantially parallel to the second flange, but is capable of being deflected by a second deflection mechanism;

wherein the first packing flexure is on a first side side of the first spool and the first flange is on a second side of the first spool;

wherein the second packing flexure is on a first side of the second spool and the second flange is on a second side of the second spool; and wherein a first edge of the tape abuts the first flange of the first spool as it unwinds, and the first edge of the tape abuts the second packing flexure as it packs onto the second spool.

* * * * *